United States Patent [19]

Hoffmann et al.

[11] 3,990,545
[45] Nov. 9, 1976

[54] DISK BRAKE WITH FLOATING SADDLE FOR VEHICLES

[75] Inventors: Friedrich Hoffmann; Klaus Bauer, both of Stuttgart; Kurt Enke, Kirchheim, all of Germany

[73] Assignee: Daimler-Benz Aktiengesellschaft, Germany

[22] Filed: Sept. 19, 1974

[21] Appl. No.: 507,563

Related U.S. Application Data

[63] Continuation of Ser. No. 277,222, Aug. 2, 1972, abandoned.

[30] Foreign Application Priority Data

Aug. 3, 1971  Germany............................ 2138776

[52] U.S. Cl............................. 188/73.3; 188/72.4; 188/73.5
[51] Int. Cl.² ........................................ F16D 55/224
[58] Field of Search................ 188/72.4, 72.5, 73.3, 188/73.4, 73.5, 73.6

[56] References Cited
UNITED STATES PATENTS

| 3,310,135 | 3/1967 | Wells | 188/73.6 |
| 3,368,647 | 2/1968 | Laverdant | 188/73.3 |
| 3,448,831 | 6/1969 | Newstead | 188/73.4 |
| 3,493,084 | 2/1970 | Maurice | 188/73.4 |
| 3,599,758 | 8/1971 | Bishop | 188/72.4 |
| 3,625,314 | 12/1971 | Rinker | 188/73.3 |

FOREIGN PATENTS OR APPLICATIONS

| 1,270,341 | 6/1968 | Germany | 188/73.3 |

*Primary Examiner*—Trygve M. Blix
*Assistant Examiner*—Edward R. Kazenske
*Attorney, Agent, or Firm*—Craig & Antonelli

[57] ABSTRACT

A partial lining disk brake with floating saddle for vehicles, particularly for motor vehicles, in which the floating saddle is constituted by an essentially plane frame that is arranged with its longitudinal webs secant-like with respect to the brake disk and which receives in one longitudinal web at least one brake cylinder and in another longitudinal web at least one abutment for the brake lining; the floating saddle is displaceably guided at the brake carrier axially parallel to the brake disk whereby the brake carrier is also constructed frame-like and, insofar as it has any supporting function, is arranged exclusively underneath the floating saddle, the floating saddle engages with downwardly extending projections in corresponding guide elements of the brake carrier to assure an accurate guidance thereof.

17 Claims, 5 Drawing Figures

DISK BRAKE WITH FLOATING SADDLE FOR VEHICLES

This is a continuation of application Ser. No. 277,222 filed Aug. 2, 1972, now abandoned.

The present invention relates to a disk brake with floating saddle or caliper for vehicles especially motor vehicles, whereby the floating saddle or caliper is constituted by an assembly plane frame which is arranged with its longitudinal webs secant-like to the brake disk, and which receives at one longitudinal web at least one brake cylinder and the other longitudinal web at least one abutment for the brake lining whereby the floating saddle is displacebly guided at the brake carrier or brake mounting axially parallel to the brake disk.

Partial lining disk brakes with floating saddles were constructed heretofore with a U-shaped floating saddle extending over the disks, from which resulted an excessively large space requirement between brake disk and wheel rim. In order to reduce this space requirement, a partial lining disk brake with floating saddle of the aforementioned type is already known, in which the floating saddle is composed of several parts. It consists of two longitudinal parts disposed laterally of the disk, into which are axially inserted the brake blocks or brake cylinders and which are held together at their ends by threaded bolts that extend over the disk. These bolts serve simultaneously for the mounting at the carrier which surrounds these bolts with small eyes (German Pat. No. 1,009,042).

This prior art brake is disadvantageous because it does not result in a completely satisfactory guidance of the brake saddle. The brake saddle of this prior art can assume an inclined position with respect to the carrier or mounting because the small eyes or lugs of the carrier do not offer any safety against such action. The floating saddle can thereby jam in these eyes without difficulty so that the free axial displaceability is no longer assured. Additionally, the exchange of the brake blocks entails considerable difficulties because for that purpose the entire saddle has to be disassembled in order that one can axially install these brake blocks.

The present invention is concerned with the task to avoid these described disadvantages. Consequently, the present invention aims at a floating saddle or floating caliper brake which assures a completely satisfactory guidance in the displaceability thereof. This is important especially when one circuit fails in a two-cylinder floating saddle brake which is operated as two-circuit brake. The cylinder, which remains operable, then seeks to cant the saddle by an asymmetric force engagement. Furthermore, the construction is to be simplified and above all the exchange of the brake blocks is to be made possible also without disassembly of the saddle. Finally, the present invention aims at constructing the brake as space-saving as possible.

The underlying problems are solved according to the present invention with the aforementioned partial lining disk brakes in that the brake carrier is also constructed frame-like and, insofar as it has any carrying or supporting function, is arranged exclusively underneath the floating saddle, and in that the floating saddle engages with downwardly extending projections into corresponding guide elements of the brake carrier. The brake carrier is therefore disposed according to the present invention with its supporting parts exclusively between the floating saddle and the disk axle.

In one embodiment of the present invention, the brake blocks are supported by means of lateral projections underneath the cylinder plane in guide grooves of the brake carrier, and these guide grooves serve simultaneously for the accommodation of guide elements at the floating saddle. It is thereby proposed in detail that the floating saddle is equipped with guide grooves at its lower boundary surface, by means of which it surrounds the upper edges of the guide grooves at the brake carrier. Another possibility resides in that according to the present invention, the brake carrier is provided with guide bars or ledges at its upper boundary surface which are surrounded both by the guide grooves at the floating saddle as also by corresponding guide grooves at the brake blocks.

Additionally, it is proposed in accordance with the present invention that the guide elements at the brake carrier extend axially in such a manner that the guide grooves or extensions provided at the brake blocks are freed therefrom upon axial displacement of the floating saddle.

The advantages of the arrangement proposed in accordance with the present invention reside primarily in a simplification of the construction of such a floating saddle brake as well as in the exact guidance of the floating saddle or caliper at the brake carrier. The floating saddle itself is a cast frame and may also simultaneously accommodate the brake pressure cylinder or cylinders. As a result thereof, the axial space requirement becomes smaller and fewer parts are necessary. The guidance of the floating saddle takes place at the brake carrier in four points disposed relatively far from one another. Consequently, a good force transmission results. The arrangement of the carrier underneath the floating frame results in a favorable force transmission and distribution in the carrier. Equally advantageous is the use of the guide grooves or guide bars for the simultaneous accommodation or mounting of the brake blocks and brake saddle. The lining support in in these deep grooves underneath the cylinder plane results in smaller bending moments in the carrier. Furthermore, the construction according to the present inventions makes possible in an advantageous manner also the use of two cylinders so that a genuine two-circuit brake per wheel is achieved and a more uniform specific compression of the lining is attained. The lining exchange is possible solely by axial displacement of the floating saddle and without disassembly of additional mounting elements. Finally, it should also be pointed out that by reason of the arrangement and construction of the carrier as proposed by the present invention, reltively large lining surfaces can be realized without difficulties.

It is additionally proposed by the present invention that the floating saddle is retained in constant abutment at the guide elements of the carrier on both sides of the brake disk by one spring each. As a result thereof, a rattling of the saddle is avoided. According to the present invention, each spring is constructed curvilinear or bow-shaped and is supported with both ends in the guide grooves at the carrier and the axial guidance thereof takes place in a goove and at ribs of the floating saddle.

Accordingly, it is an object of the present invention to provide a partial lining disk brake with floating saddle for vehicles which avoids by simple means the aforementioned shortcomings and drawbacks encountered in the prior art.

Another object of the present invention resides in a partial lining disk brake with floating saddle for motor vehicles which results in a completely satisfactory guidance of the floating saddle while at the same time minimizing the space requirements between brake disk and wheel rim.

A further object of the present invention resides in a partial lining disk brake with floating saddle of the type described above which assures proper operation at all times and facilitates the exchange of the brake blocks by obviating the need of disassembly of parts of the floating saddle.

Still a further object of the present invention resides in a partial disk brake with floating saddle which permits a genuine two-cylinder floating saddle brake without the danger of jamming in case of failure of one of the circuits.

Still another object of the present invention resides in a disk brake of the type described above which results in a simplification of its construction, good guidance of the displaceable parts, excellent force distribution in the supporting members and easy servicing.

These and other objects, features and advantages of the present invention will become more apparent from the following description when taken in connection with the accompanying drawing which shows, for purposes of illustration only, two embodiments of a disk brake in accordance with the present invention, and wherein.

Figure 1:
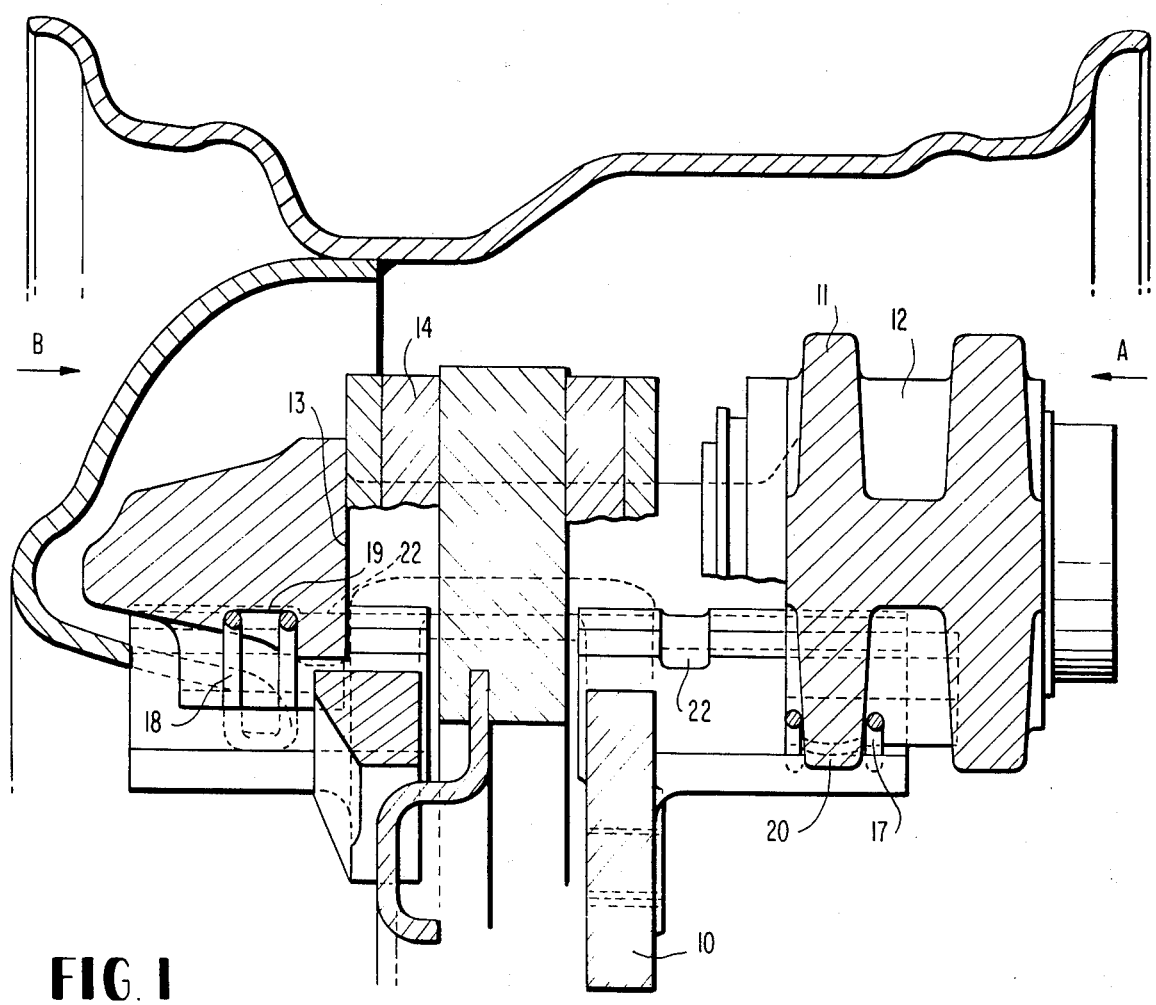
FIG. 1 is a cross-sectional view through a partial lining disk brake in accordance with the present invention.

Referring now to the drawing wherein like reference numerals are used throughout the various views to designate like parts, according to FIGS. 1 to 4, a brake carrier 10 is rigidly secured at the axle carrier (not shown) of conventional construction. The brake carrier 10 is constructed frame-like (see especially FIGS. 2 and 3) and is arranged underneath the floating saddle 11. The floating saddle 11 is also constructed frame-like and accommodates on one side two brake cylinders 12. On the other side, the brake saddle 11 forms an abutment 13 for the brake linings 14.

Two guide grooves 15 (FIGS. 2, 3 and 4) are provided at the brake carrier 10, into which the floating saddle 11 engages by means of its projection 16 (FIGS. 2 and 3) that are arranged approximately at its lower boundary surface. In this manner, the floating saddle 11 is completely accurately guided at the brake carrier 10 in four points disposed relatively far apart. In order to prevent a rattling of the saddle 11, bow-like curved springs 17 and 18 are provided which are supported with their ends in the grooves 15 of the brake carrier 10 (FIGS. 2 and 3) and which abut with their center area at the brake saddle 11. The axial guidance of the springs 17 and 18 takes place, on the one hand, by a groove 19 (FIG. 1) at the brake saddle 11 and, on the other, at a rib 20 of the saddle 11.

Figure 2:
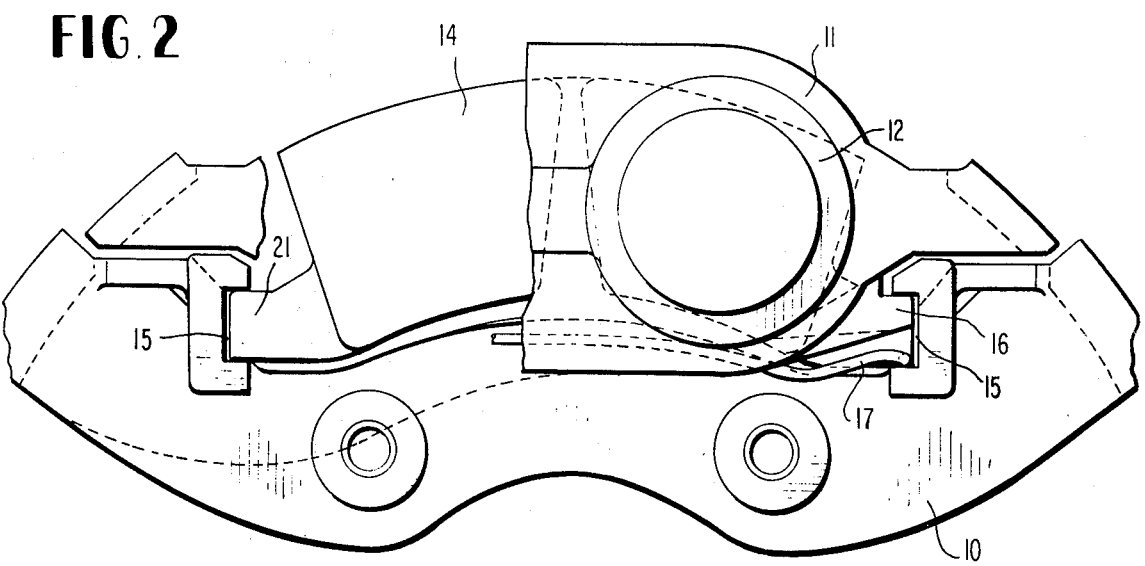
FIG. 2 is an elevational view of the partial lining disk brake in the direction of arrow A of FIG. 1, with parts thereof broken away.
Figure 3:
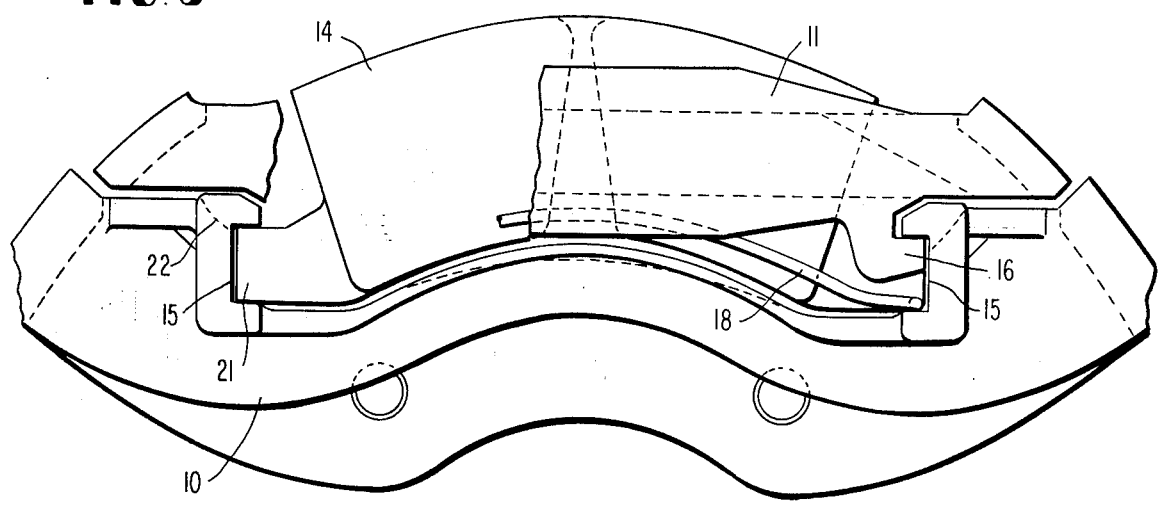
FIG. 3 is an elevational view of the partial lining disk brake in the direction of arrow B in FIG. 1, with parts broken away.
Figure 4:
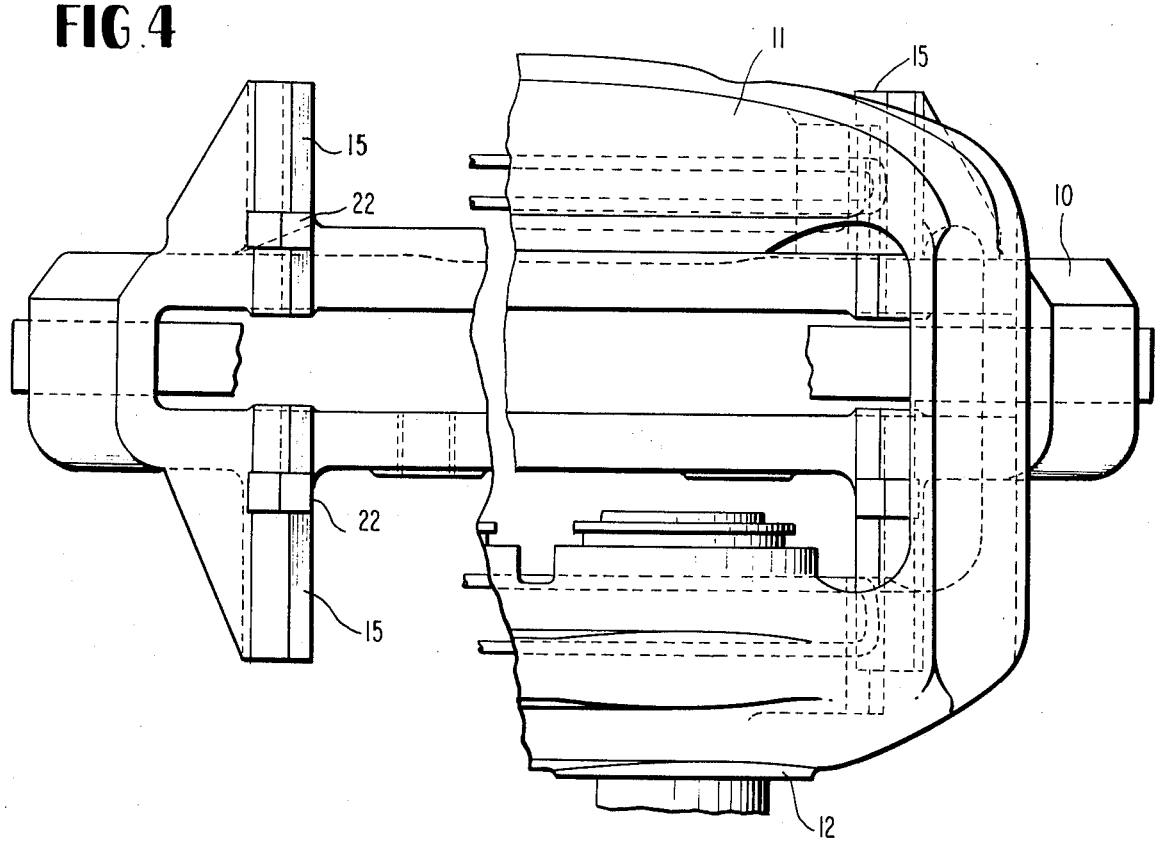
FIG. 4 is a top plan view of the partial lining disk brake according to FIG. 1, with parts again broken away for the sake of clarity.

The grooves 15 serve simultaneously for the guidance and support of the brake linings 14 which, for that purpose, engage in these grooves 15 with lateral projections 21 thereof (FIGS. 2 and 3). These grooves 15 are interrupted in their upper part by cut-in openings or notches 22 (FIG. 4). With a corresponding axial displacement, the projections 21 of the brake linings 14 now reach these cut-ins 22 so that the brake linings 14 can be removed radially toward the outside. Further mounting elements need not be disengaged for that purpose. The exchange of the linings 14 is therefore extremely simple.

Figure 5:
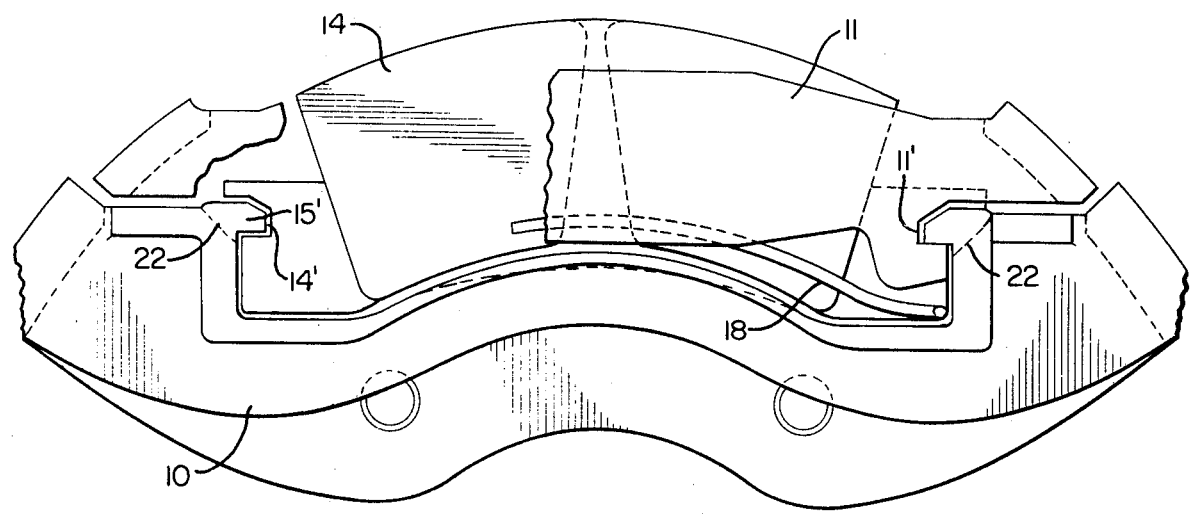
FIG. 5 is an elavational view of a further embodiment of a partial lining disk brake in the direction of arrow B of FIG. 1, with parts broken away.

As shown in FIG. 5, in lieu of the guide grooves 15, also guide bars 15' may be provided at the brake carrier 10 — which may correspond approximately to the upper inwardly directed nose of the groove 15 — and which then are surrounded by corresponding grooves 11' and 14', respectively, at the brake saddle 11 and at the brake linings 14. In this manner, a further reduction of the structural height can be achieved.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A disk brake arrangement with a floating saddle means for selectively moving a brake lining means into engagement with opposite sides of a brake disk means, in which the floating saddle means is formed by a substantially planar frame structure having a first pair of spaced leg portions arranged secant-like with respect to said brake disk means on respective sides thereof and a second pair of leg portions extending substantially parallel to the axis of the brake disk means for connecting the respective ends of the first pair of leg portions, at least one brake cylinder means provided at one of the first pair of spaced leg portions, at least one abutment means for at least one of said brake lining means provided at the other of the first pair of spaced leg portions, brake carrier means for guiding the floating saddle means so that it can be displaced substantially axially parallel to the brake disk means, characterized in that the brake carrier means is formed by a substantially planar frame structure having a first pair of leg portions arranged secant-like with respect to the brake disk means and a second pair of leg portions extending substantially parallel to the axis of the brake disk means for connecting the respective ends of the first pair of spaced leg portions of the brake carrier means, the brake carrier means, insofar as it has a supporting function, is arranged exclusively below the floating saddle means between the floating saddle means and the brake disk axis, downwardly extending guide means are provided on the floating saddle means, guide means are provided on the brake carrier means for engaging the downwardly extending guide means of the floating saddle means and include guide bar means provided at the upper boundary surface thereof, the brake lining means are supported by laterally extending guide means engageable with the same guide means of the brake carrier means as the downwardly extending guide means of the floating saddle means, the guide means of the floating saddle means includes groove means substantially surrounding the guide bar means, and in that the laterally extending guide means of the brake lining means includes guide groove means substantially surrounding the guide bar means.

2. A disk brake according to claim 1, characterized in that the guide means of the brake carrier means have a dimension in the axial direction of the brake disk means which permits the guide groove means of the brake lining means to be freed from the brake carrier guide means upon an axial displacement of the floating saddle means.

3. An arrangement according to claim 1, characterized in that means are provided for preventing rattling of the floating saddle means.

4. An arrangement according to claim 3, characterized in that the means for preventing rattling includes at least one spring means disposed on each side of the brake disk means for biasing the floating saddle means into engagement with the guide groove means provided on the brake carrier means.

5. An arrangement according to claim 4, characterized in that axial guidance means are provided for each of the spring means.

6. An arrangement according to claim 1, characterized in that the guide bar means are provided with cutout portions, which cutout portions extend in the radial direction of the brake disk means, and in that the laterally extending guide means provided on the brake lining means are removable through said cutout portions upon a predetermined axial displacement of the floating saddle means.

7. An arrangement according to claim 1, characterized in that at least one spring means is disposed on each side of the brake disk means for biasing the floating saddle means into engagement with the guide means provided on the brake carrier means.

8. A disk brake arrangement with a floating saddle means for selectiely moving a brake lining means into engagement with opposite sides of a brake disk means in which the floating saddle means is formed by a substantially planar frame structure having a first pair of spaced leg portions arranged secant-like with respect to said brake disk means on respective sides thereof and a second pair of leg portions extending substantially parallel to the axis of the brake disk means for connecting the respective ends of the first pair of leg portions, at least one brake cylinder means provided at one of the first pair of spaced leg portions, at least one abutment means for at least one of said brake lining means provided at the other of the first pair of spaced leg portions, brake carrier means for guiding the floating saddle means so that it can be displaced substantially axially parallel to the brake disk means, characterized in that the brake carrier means is formed by a substantially planar frame structure having a first pair of leg portions arranged secant-like with respect to the brake disk means and a second pair of leg portions extending substantially parallel to the axis of the brake disk means for connecting the respective ends of the first pair of spaced leg portions of the brake carrier means, the brake carrier means, in so far as it has a supporting function, is arranged exclusively below the floating saddle means between the floating saddle means and the brake disk axis, downwardly extending guide means are provided on the floating saddle means, guide means are provided on the brake carrier means for engaging the downwardly extending guide means of the floating saddle means, and in that the brake lining means are supported by laterally extending guide means engageable with the same guide means of the brake carrier means as the downwardly extending guide means of the floating saddle means, the guide means provided on the floating saddle means are downwardly projecting extension means including laterally extending portions, the guide means on the brake carrier means includes guide groove means disposed directly below the floating saddle means in a plane extending at right angles to the plane of the brake disk means for receiving the laterally extending portions of the floating saddle means, and in that the laterally extending guide means of the brake lining means are lateral projections engaging a surface of the guide groove means of the brake carrier means disposed beneath a plane extending through the lowermost portion of the brake cylinder means, means are provided for preventing rattling of the floating saddle means including at least one spring means disposed on each side of the brake disk means for biasing the floating saddle means into engagement with the guide groove means provided on the brake carrier means, axial guidance means are provided for each spring means, and in that the axial guidance means includes a rib portion provided in the saddle means and a groove provided in the abutment means.

9. An arrangement according to claim 8, characterized in that the spring means includes bow shaped springs the respective ends of which are disposed in the groove means provided in the brake carrier means.

10. An arrangement according to claim 9, characterized in that the bow shaped springs include a central portion which abuts the floating saddle means.

11. An arrangement according to claim 10, characterized in that one of the bow shaped springs includes first and second spaced portions disposed on respective sides of the rib portion provided on the floating saddle means and at least a third portion bridging the width of the rib portion.

12. An arrangement according to claim 11, wherein the other of the bow shaped springs includes first and second spaced spring portions disposed on respective sides of the groove provided in the abutment means.

13. An arrangement according to claim 12, characterized in that a cutout portion is provided in the guide groove means of the brake carrier means, which cutout portion extends in the radial direction of the brake disk means, and in that the laterally extending guide means provided on the brake lining means are removable through the cutout portions upon a predetermined axial displacement of the floating saddle means.

14. A disk brake arrangement with a floating saddle means for selectively moving a brake lining means into engagement with opposite sides of a brake disk means in which the floating saddle means is formed by a substantially planar frame structure having a first pair of spaced leg portions arranged secant-like with respect to said brake disk means on respective sides thereof and a second pair of leg portions extending substantially parallel to the axis of the brake disk means for connecting the respective ends of the first pair of leg portions, at least one brake cylinder means provided at one of the first pair of spaced leg portions, at least one abutment means for at least one of said brake lining means provided at the other of the first pair of spaced leg portions, brake carrier means for guiding the floating saddle means so that it can be displaced substantially axially parallel to the brake disk means, characterized in that the brake carrier means is formed by a substantially planar frame structure having a first pair of leg portions arranged secant-like with respect to the brake disk means and a second pair of leg portions extending substantially parallel to the axis of the brake disk means for connecting the respective ends of the first pair of spaced leg portions of the brake carrier means, the brake carrier means, in so far as it has a supporting function, is arranged exclusively below the floating saddle means between the floating saddle means and the brake disk axis, downwardly extending guide means are provided on the floating saddle means, guide means are provided on the brake carrier means for engaging the downwardly extending guide means of the floating saddle means, the brake lining means are supported by laterally extending guide means engageable with the same guide means of the brake carrier means as the downwardly extending guide means of the floating saddle means, the guide means provided on the brake carrier means includes guide bar means provided at the upper boundary surface thereof, the guide means of the floating saddle means includes groove means substantially surrounding the guide bar means, the laterally extending guide means of the brake lining means includes guide groove means substantially surrounding the guide bar means, the guide bar means are provided with cut out portions extending in the radial direction of the brake disk means, the laterally extending guide means provided on the brake lining means are removable through said cutout portions upon a predetermined axial displacement of the floating saddle means, at least one spring means disposed on each side of the brake disk means is provided for biasing the floating saddle means into engagement with the guide means provided on the brake carrier means, and in that a downwardly projecting rib portion is provided on the floating saddle means and a groove is provided in the abutment means for axially guiding the spring means.

15. A brake arrangement according to claim 14, characterized in that the spring means includes bow shaped springs the respective ends of which are disposed in groove means provided in the brake carrier means.

16. A brake arrangement comprising: a brake disk means, brake lining means disposed on respective sides of said brake disk means for selective engagement therewith, a substantially planar floating saddle means for selectively moving said brake lining means into and out of engagement with said brake disk means, said floating saddle means being provided with first and second pairs of spaced frame members, said first pair of frame members being disposed on respective sides of said brake disk means and extending in a longitudinal direction parallel to the respective sides of said brake disk means, said second pair of frame members extending traversely of said brake disk means bridging the edge thereof and connecting the respective ends of said first pair of frame members, at least one brake cylinder means operatively engageable with said saddle means for selectively moving said saddle means, abuttment means provided on said saddle means for maintaining at least one of said brake lining means in a predetermined relationship with respect to said brake disk means, a substantially planar brake carrier means for carrying said floating saddle means, said brake carrier means being provided with first and second pairs of spaced frame members, said first pair of frame members of said brake carrier means being disposed on respective sides of said brake disk means and extending in a longitudinal direction parallel to the respective sides of said brake means, said second pair of frame members of said brake carrier means extending transversely of said brake disk means bridging the edge thereof and connecting the respective ends of said first pair of frame members of said brake carrier means, such that said first and second pairs of frame members of said brake carrier means and said floating saddle means defined therebetween a radially extending opening for accommodating an arcuate portion of said brake disk means, said radial opening having a width defined by the spacing between said first frame members of one of said brake carrier means and said floating saddle means and having a length defined by the spacing between said second frame members of one of said brake carrier means and said floating saddle means whereby only said second frame members of said brake carrier means and said floating saddle means extend over the edge of said brake disk means, guide means at each of said second frame members of said floating saddle means for guiding the displacement thereof, guide means at respective side edges of said brake lining means for guiding the displacement thereof, guide groove means provided in each of said second frame members of said brake carrier means for receiving said guide means of both of said floating saddle means and said brake lining means, each of said guide groove means includes a guide groove having an upper and lower surface, each of said guide means of said floating saddle means and said brake lining means includes a projection having an upper and lower surface, each of said upper surfaces of said projection of said floating saddle means engaging only at the upper surface of a respective guide groove, the lower surface of each of said guide grooves is disposed beneath a plane extending through the lowermost portion of said at least one brake cylinder means whereby said brake lining means are exclusively supported beneath the plane by the respective projection means of said brake lining means.

17. An arrangement according to claim 16, wherein each of said guide grooves includes a pair of notches extending in the radial direction of the brake disk means, said notches being coordinted to the respective projections of said brake lining means whereby said brake lining means are removable upon a predetermined axial displacement of said floating saddle means.

* * * * *